(12) United States Patent
Tannenbaum

(10) Patent No.: US 7,574,724 B2
(45) Date of Patent: *Aug. 11, 2009

(54) VIEWER SELECTION OF PROGRAMS TO BE SUBSEQUENTLY DELIVERED

(75) Inventor: David H. Tannenbaum, Dallas, TX (US)

(73) Assignee: Union Beach, L.P., Dallas, TX (US)

( * ) Notice: Subject to any disclaimer, the term of this patent is extended or adjusted under 35 U.S.C. 154(b) by 187 days.

This patent is subject to a terminal disclaimer.

(21) Appl. No.: 11/442,492

(22) Filed: May 26, 2006

(65) Prior Publication Data

US 2006/0218599 A1 Sep. 28, 2006

Related U.S. Application Data

(60) Continuation of application No. 10/820,554, filed on Apr. 8, 2004, now abandoned, which is a division of application No. 09/625,646, filed on Jul. 27, 2000, now Pat. No. 6,807,568.

(51) Int. Cl.
*H04H 60/33* (2008.01)
*H04N 7/173* (2006.01)

(52) U.S. Cl. .............................. 725/86; 725/9; 725/109

(58) Field of Classification Search ............. 725/32–36, 725/86, 105, 109–110
See application file for complete search history.

(56) References Cited

U.S. PATENT DOCUMENTS

| | | | |
|---|---|---|---|
| 4,706,121 A | 11/1987 | Young | |
| 5,003,384 A | 3/1991 | Durden et al. | |
| 5,237,462 A | 8/1993 | Jo et al. | |
| 5,351,075 A | 9/1994 | Herz et al. | |
| 5,371,795 A | 12/1994 | Vogel et al. | |
| 5,684,963 A * | 11/1997 | Clement | 705/26 |
| 5,754,939 A | 5/1998 | Herz et al. | |
| 5,767,893 A | 6/1998 | Chen et al. | |
| 5,835,087 A | 11/1998 | Herz et al. | |
| 5,842,178 A | 11/1998 | Giovannoli | |
| 5,852,478 A | 12/1998 | Kwoh | |
| 5,956,716 A * | 9/1999 | Kenner et al. | 707/10 |
| 5,963,264 A | 10/1999 | Jackson | |
| 5,974,406 A | 10/1999 | Biskikian et al. | |
| 6,052,714 A | 4/2000 | Miike et al. | |
| 6,055,536 A | 4/2000 | Shimakawa et al. | |
| 6,073,119 A * | 6/2000 | Bornemisza-Wahr et al. | 705/42 |

(Continued)

OTHER PUBLICATIONS

Assignment data for application No. 09378533.*

(Continued)

*Primary Examiner*—Dominic D Saltarelli
(74) *Attorney, Agent, or Firm*—Fulbright & Jaworski L.L.P.

(57) ABSTRACT

Television users may record abstracts of programs that they desire and program providers may access the recorded program abstracts from time to time so as to provide the program content that matches the requested program. In one embodiment, the user may select a TV program (or movie) that is not currently available and then at a time subsequent thereto that program is made available to the user, either privately, or over the public network. In another embodiment, users of the system may record program requests. Program providers may then access these requests from time to time and provide the requested program, even if the program had not been available at the time the request was initially posted.

20 Claims, 4 Drawing Sheets

U.S. PATENT DOCUMENTS

| | | | |
|---|---|---|---|
| 6,075,526 | A | 6/2000 | Rothmuller |
| 6,125,259 | A * | 9/2000 | Perlman ..................... 725/28 |
| 6,208,799 | B1 | 3/2001 | Marsh et al. |
| 6,236,991 | B1 | 5/2001 | Frauenhofer et al. |
| 6,345,293 | B1 | 2/2002 | Chaddha |
| 6,400,941 | B1 | 6/2002 | Nara et al. |
| 6,434,747 | B1 | 8/2002 | Khoo et al. |
| 6,493,724 | B1 | 12/2002 | Cusack et al. |
| 6,564,253 | B1 | 5/2003 | Stebbings |
| 6,574,608 | B1 | 6/2003 | Dahod et al. |
| 6,594,682 | B2 | 7/2003 | Peterson et al. |
| 6,647,425 | B1 | 11/2003 | Chaddha |
| 6,654,735 | B1 | 11/2003 | Eichstaedt et al. |
| 6,789,252 | B1 | 9/2004 | Burke et al. |
| 6,807,568 | B1 * | 10/2004 | Tannenbaum ............... 709/217 |
| 7,113,919 | B1 | 9/2006 | Norris et al. |
| 7,149,964 | B1 * | 12/2006 | Cottrille et al. ............. 715/234 |
| 2001/0025245 | A1 | 9/2001 | Flickinger et al. .............. 705/1 |
| 2002/0013735 | A1 | 1/2002 | Arora et al. |
| 2002/0023042 | A1 | 2/2002 | Solomon |
| 2002/0133412 | A1 * | 9/2002 | Oliver et al. .................. 705/26 |
| 2004/0117831 | A1 * | 6/2004 | Ellis et al. ..................... 725/53 |
| 2004/0153369 | A1 | 8/2004 | Bencak |
| 2005/0010498 | A1 | 1/2005 | Tannenbaum |
| 2005/0149410 | A1 | 7/2005 | Livesay |

OTHER PUBLICATIONS

"The Internet on your handheld," AvantGo, Inc., obtained from http://avantgo.com/frontdoor/index.html, on Nov. 3, 2000.

"About Avantgo, Inc.," AvantGo, Inc., obtained from http://avantgo.com/corp/company/index.html on Nov. 3, 2000.

U.S. Appl. No. 09/378,533 to McKissick et al., filed Aug. 20, 1999.

Eaglesham, John, "Court rules on internet trademark use", Financial Times, Jun. 2, 200, 2 pgs.

Gnutella11, "John Barker writes: DOT communism?", Inside Multimedia, Jun. 4, 200, 2 pgs.

Gnutella12, Barmann, Timoth, "The music trade—on the internet, a vast music library is a click away, but song swapping is turning copyright law on its ear", Providence Journal, Jul. 23, 2000, 3 pgs.

Gnutella13, Streitfeld, Davis, "The web's next step: Unraveling itself; software threatens search engines", The Washington Post, Jul. 18, 2000, 5 pgs.

Gnutella14, "Peer to peer networking is poised to revolutionize the internet once again", Infoworld, Jul. 17, 2000, 3 pgs.

"The Internet on Your Handheld", AvantGo Inc., obtained from: http://avantgo.com/frontdoor/index.html., on Nov. 3, 2000.

"About AvantGo, Inc.", AvantGo Inc., obtained from: http://avantgo.com/corp/company/index.html., on Nov. 3, 2000.

Gnutella9, Baales, Jorge, EFE new Service, "US-Internet new open source program poses challenge to giant internet Portal", dated May 18, 2000.

Definition of Flag, Microsoft Computer Dictionary, Fourth Edition, Dated Circa 1999.

Gnutella 10, Wikipedia, A discussion of the advent of Gnutella's peer to peer software release which shows the release to be Mar. 14, 2000, dated Nov. 6, 2007.

Gnuetell5, Business Wire, "Sight.com expands mivie distribution to include the Gnutella file sharing network; Move designed to further leverage hyperdistribution capabilities of the internet", dated Jun. 14, 2000.

Gnutella6, Business Wire, "Programming team behind Gnutella movement pioneers world's first distributed, real time search engine prototype", dated Jun. 1, 2000.

Gnutella7, Fitzpatric, Eileen, "Bill Board" dated Jul. 1, 2000.

Gnutella8, Horiuchi, Vince, "Web site under fire from music industry for supplying songs to download", dated May 8, 2000.

Gnutella1, Jenkins, Holman, "Gangsta Napster", The Asian Wall Street Journal dated May 17, 2000.

Gnutella2, Jenkins, Holman, "Wall Street Journal" dated May 12, 2000.

Gnutella3, Ansdell, Ian, "Music chiefs stopped in their tracks", dated Jul. 7, 2000.

Gnutella4, Bedell, Doug, "Online copyright crisis moves beyond music", dated Jun. 22, 2000.

Gnutella, Gomes et al, "New web technology unties pc's—Peer-to-Peer pressures conventional practices cutting out middlemen—Netscape's Andreessen jumps on board", Asian Wall Street Journal, Jul. 6, 2000.

* cited by examiner

VIEWER SELECTION OF PROGRAMS TO BE SUBSEQUENTLY DELIVERED

CROSS-REFERENCE TO RELATED APPLICATIONS

The present invention is a continuation of U.S. patent application Ser. No. 10/820,554, filed Apr. 8, 2004, entitled "SYSTEM AND METHOD FOR PROGRAM END TIME ADJUSTMENT", which in turn, is a divisional of U.S. patent application Ser. No. 09/625,646, now U.S. Pat. No. 6,807,568, filed Jul. 27, 2000, entitled "RECIPIENT SELECTION OF INFORMATION TO BE SUBSEQUENTLY DELIVERED," both of which priority are hereby claimed and which is hereby incorporated by reference herein.

TECHNICAL FIELD

This invention relates to the delivery of entertainment programs from a program provider to a program seeker and more particularly to a system and method for allowing a program provider to find and provide information to potential viewers.

BACKGROUND OF THE INVENTION

Currently, when it is desired to watch a TV program, the viewer is at the mercy of the content providers as to what that viewer watches and at what time. This is changing now that digital recorders, such as the TIVO system from Philips, can record many hours of TV programs thereby allowing viewers to delay watching broadcasts for a period of time by recording such broadcasts for later viewing. Such systems also allow users to select programs to be aired in the future and to record the selected shows. These systems also allow users to select topics and the system selects the shows that match these selected topics. Such systems work well, but suffer from the fact that they also are dependent upon the preselection of content by the content provider. If a person desires to view a certain movie, (or to view, for example, a documentary on the life of George Washington) and if that desired movie (or documentary) was not scheduled for showing within a finite time in the future, the user is not be able to schedule it, except perhaps by broad topic types. In any event, the user cannot in any manner, cause movies, or programs, to be delivered which were not scheduled for delivery.

This same problem exists when users are trying to obtain information from the Internet. The user can only gain access to information if that information exists on the Internet at the time that the information is sought. However, even if the information existed on the Internet at that time, obtaining that information, even using the very sophisticated tools available today, is not trivial. For example, assume that a user desires to obtain tickets to see a certain play (or concert) or to see a certain performer when and if that play, concert or performer is next in town. Today, the user would access the Internet and look for the name of the play or the name of the performer. If there was a scheduled performance, the user might, depending upon his/her skill (and patience), find it. But if there was nothing scheduled (or contemplated) then the user would come away (usually after spending considerable time looking) with nothing.

Thus, there exists a need in the art for a system and method which allows an information seeking individual to gather information even when that information is not currently available and to have that information delivered when it becomes available.

There is also a need in the art for a system and method which allows a user to schedule the delivery of desired information at controllable times in the future using media mutually agreed upon by the requesting and providing parties.

BRIEF SUMMARY OF THE INVENTION

These and other objects, features and technical advantages are achieved by a system and method which allows the user to input to his/her own local device the information (or an abstract thereof) that he/she desires to be delivered. This information can be as simple or as complex as desired. What is important is that some other party can, from time to time, access the requested information and provide proper responses thereto.

The information, by way of example, can be the names of desired entertainment shows, or subjects, that could be delivered by way of video or live TV. The names, or abstracts, can be, by way of example, past TV shows or past TV subjects; names of biographies or travel documentaries, or they can be queries as to the dates that a certain play or performer will next be in town; or any other desired information. Thus, a person wishing to view on TV a series that aired months ago (or the first three programs of that series) will, in one embodiment, enter the desired requested information into his/her local storage medium. The storage mechanism could be a local recorder, such as the above-mentioned digital recorder, (or any other system), or it could be the user's browser on the Internet. In the preferred embodiment the information is stored on the user's local computer. In an alternate embodiment, the abstracted request is stored on one or more remote devices. The user would enter "deliver by TV over cable (or satellite, or any other desired medium)" a program or programs pertaining to the life of "George Washington". This entry could, of course, be prompted by interactive prompts. If the user had more specific information on the desired program, the user could, if he/she desires, enter such additional details.

It is important to note that the requested information can be stored locally on a TV recorder or stored on a local computer or on any other device having memory capability. The storage medium that the user selects need not be the medium to where the information is to be returned. The user may specify the return medium or the information provider may, by the nature of the content that is to be delivered or otherwise, decide how best and when to deliver the information. The return information can actually arrive using multiple media either in whole or in part. For example, the provider may send a message (using the Internet to the user's PC or perhaps a wireless connection to the user's handheld device) indicating that a certain requested TV program will be available at a certain date on a particular channel. Then, at the proper time (or at a time negotiated between the provider and the requester) the desired information is delivered to the user over a medium different from the one used to verify or confirm the transaction, and perhaps even different from the medium over which the initial request was posted.

One important aspect of this invention is that the requested information is maintained in a location (whether local to the user or remote) such that it remains available for a period of time to anyone who is capable of providing the desired information which is controlled by the provider. Thus, instead of the user searching a massive data base (the web today) the burden falls on information providers to find those folks who need or want the information which is controlled by the provider. This system works particularly well for situations where the desired information pertains to future events, such as entertainment, or for complex situations where the user only has a vague understanding of what he/she desires. In this situation, the content owner knows much more about the subject, and, based on the abstract of the information posted, can provide the proper response.

Thus for vacation planning a person might type in the location desired and the time of year desired and request information on climate, hotel availability, restaurants, etc. This information then would be stored (either at the user's location) or at a central site, and will be accessible for a period of time by anyone who believes they have the desired information. The return information can then be delivered without further action taken by the posting user. There could be an interactive exchange prior to downloading of the information. Today, this interaction is only possible if the user were to first go to a scientific site to post his/her desired information.

The vacation planner instead of specifying the place could have entered parameters, such as time of year, climate, desired activities (beach, golfing, shopping, hiking, sailing, etc.,) and those locations desiring to supply information would then provide either the information or an abstract of the information, and the user (either live or via a filter program) would accept as much information as is desired.

In the context of entertainment, assume the user requested a TV program on George Washington. The requester could have specified a desired time frame or could have left it open ended. The user could also have specified the type of media over which the program was to be received or again, left it open ended. In any event, assume that a provider had the program or a series of programs pertaining to George Washington, and could deliver the content at a certain time. The provider would then notify the user that a two hour program on George Washington would be available, for example, on channel 87 at 2:00 p.m. Wed., three months hence. The user could accept this time and arrange for it to be recorded if he/she were not going to be available to watch it live. This recording could be by traditional VCR or by digital recording under processor control. In one embodiment, the recorder would be set and controlled by the provider.

Assuming that the user wanted the information sooner, one option would be to accept the information as a streamed video directly into the user's computer for recording on a CD or other portable recording device at a mutually agreeable time. The content could, of course, be delivered in any manner agreed between the sender and the user.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

For a more complete understanding of the present invention, and the advantages thereof, reference is now made to the following descriptions taken in conjunction with the accompanying drawing, in which.

DETAILED DESCRIPTION OF THE INVENTION

Figure 1:
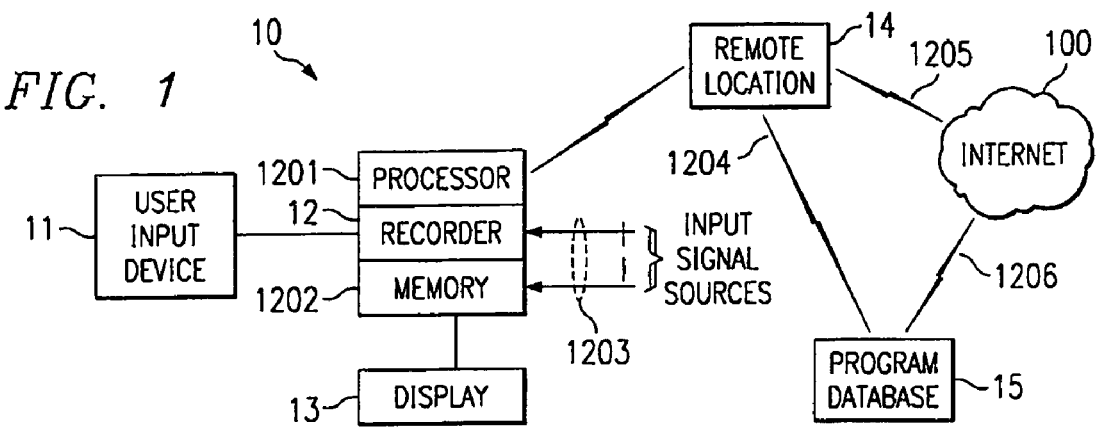
FIG. 1 shows an embodiment of the invention using TV programs and a digital recording device at the user's location.

Turning now to FIG. 1, there is shown system 10, which has user input device 11 which could, for example, be a remote control into the TV set or digital recorder or a computer or any other input device, such as a wireless phone. The input could be by voice command, using, for example, a voice recognition system. In the TV environment, the input could be to digital recorder 12, such as, for example, the aforementioned TIVO recorder provided by Philips. Such a device would typically have processor 1201 and memory 1202 and would operate to receive input signals from a variety of sources such as, for example inputs 1203. This data can be in analog or digital form and would be stored in a memory. In the illustrative embodiment, analog signals are digitized by recorder 12 and stored in memory 1202. Information stored in memory 1202 is made available to display 13 on command from the user, or, alternatively, under control of the information provider.

Recorder 12 is designed to interact with a remote location 14 either by phone connection, satellite or by any other mechanism, whether wireless or wireline, to exchange information pertaining to the lineup on the various channels. In this manner the user, using input device 11, may determine what is available today, tomorrow or sometime in the future. This then allows the user to select, (and set for recording if desired) certain programs which will become available over input 1203 at future times. This information is updated periodically via a connection made between recorder 12 and remote location 14, thereby assuring recorder 12 that it has the latest program information.

User 11 may specify to recorder 12, usually in the form of an interactive session between user device 11 and recorder 12, that the user desires to watch certain programs by name or type, which programs will occur in the future. Recorder 12 then monitors the information received from remote location 14 and picks out of the titles or other information made available the information desired to be recorded. Thus, for example, user 11 may decide that he or she wants to see only those programs featuring a certain artist. If that information is available from remote location 14, then recorder 12 will monitor the information and, whenever an input program arrives having that artist, the recorder will proceed to record the program.

The problem at this point, however, is that if recorder 12 has no information pertaining to future programs, movies, artists, etc., then the interactive session between user 11 and recorder 12 will not achieve the desired result, i.e., the scheduling of a desired program.

In the embodiment shown in FIG. 1 user 11 could input to recorder 12 the desired movie, series, concept, artist or any other desired information. This information then is provided from recorder 12 to remote location 14, for example, over the periodic connection between the two. Remote location 14 then stores the information pertaining to user 11. Location 14 then accesses data base 15, which could be local to remote location 14 or remote therefrom. This access can either be direct, via connection 1204, or it could be through Internet 100 via connections 1205, 1206.

In one embodiment, location 14 simply records the information and makes it available for remote providers to access the desired user information via Internet 100 in a manner to be discussed. Once the information is available, one or more potential providers could see that one or more users wish to see a program, for example, a program about George Washington. Accordingly, one or more of these potential providers could then either make the program available at a time in the future so that many viewers could then watch that program or the remote provider could make the program available only to user 11 over a specific channel at a specific time.

In either event, the remote provider would instruct recorder 12 at user location 10 to record that information for that user. In addition, the remote provider, assuming enough information was on file pertaining to user 11, could contact user 11 over the Internet via a separate PC, not shown in FIG. 1, or by e-mail, wireless messaging, telephone call, message left on recorder 12, or the like. The provider would interact with user 11 to instruct user 11 as to when the program will be available, or to interact with user 11 to refine the request and to, perhaps, schedule alternate modes and/or media for delivery. It could, for example, be most appropriate to provide the information via an alternate network directly from program data base 15 to the user's PC, for recording on a medium separate from recorder 12. In either event, the user will eventually see or have available to him/her the program that that user desires when that information becomes available.

As discussed, the information may be information about a past TV series, past historical events, news reports, sports, or the requested information might be about a planned future event. This could occur if user 11, for example, were to input that he/she desires all information pertaining to natural disasters in a certain location or desires information pertaining to nuclear testing activities or any other activity that he/she desires to monitor if and when that information becomes available. Under such a condition various providers of content anywhere in the world may access remote location 14 via Internet 100, or otherwise, to determine which users would like to have information pertaining to subject matter which it has available. In this manner specific information can be made available to users, such as user 11, even though that information is not available at the time user 11 asks for it, but subsequently becomes available, or subsequently is constructed based upon one or more users requesting such information.

Note that while the information request was transferred from the user's location to a remote location, the system could be constructed so that the request is maintained local to the user and potential providers would then access the user's location from time to time to monitor such requests. Certainly, user 11 could put time restraints on the request and have the request disappear or become modified after a certain period of time.

Figure 2:
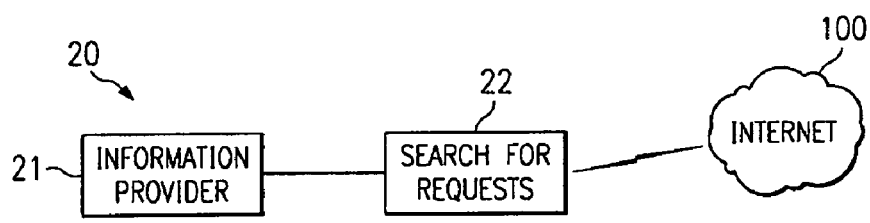
FIG. 2 shows a block diagram of an information provider location.

Turning now to FIG. 2, system 20 shows information provider 21 having a search engine 22 which searches Internet 100 (or which searches directly) to other locations for requests that include within them information that provider 21 has an ability to deliver. Information provider 21 might search for requests that it does not have the ability to deliver at this time but could go out and purchase, obtain or create depending upon the perceived market for that information as determined by its continuing search for requests. This search could be, for example, into PC*s or other devices located at user's premises which have on them permission for access. In some situations, search engine 22 might only be able to search PC *s which are then active on the Internet. Also, information provider 21 could be prevented from downloading any information to a user until an interactive session is held with that user such that both parties agree that what is to be provided matches what is desired to be received. Also, the parties can determine what the media will be for distribution, what the payment will be, if any, and what the various responsibilities and liabilities of the parties are with respect to the information. The information could be controlled by codes or flags and different permission levels could be established for different types of information or for different types of providers. Note that program database 15, FIG. 1, could, if desired, include system 20.

Figure 3:
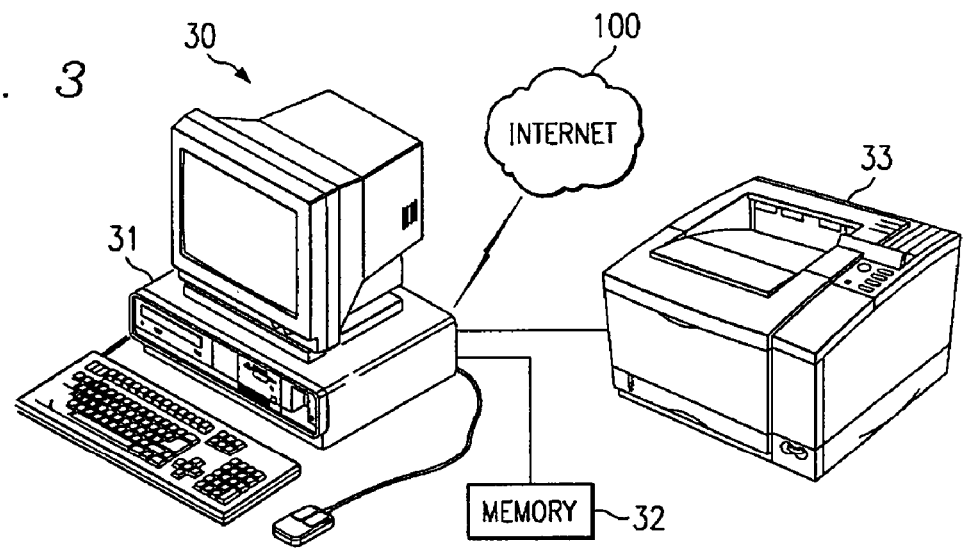
FIG. 3 shows an embodiment of the invention using a processor, such as a PC, at the user's location.

FIG. 3 shows system 30 which includes an alternative method of user input, such as, for example, PC 31 which allows the user to store the information requests in memory 32, which typically would be internal to PC 31, but which could be external thereto if desired. These requests, as discussed above, could be maintained local or could be sent out over Internet 100, or otherwise, to a remote site. For example, the user at PC 31 might desire tickets to a circus coming to town at some time in the future unknown to the user. The user simply records the abstracted information "circus" in memory 32 which then becomes accessible via Internet 100. Anyone having information pertaining to a circus once a circus is scheduled for the locality of PC 31 (assuming that user 31 desires the locale to be local), will scan the system looking for a seeker who has posted a desire for information pertaining to a circus.

Note that PC21 could be any type of processor and/or memory, including a telephone, pager, portable computer, personal assistants and the like.

Thus, information provider 21, (FIG. 2) which could be the circus itself, or an intermediate web site acting on behalf of the circus, could then, by use of search engine 22, realize that the user at PC 31 desires information pertaining to the circus and requires 4 tickets to that circus. Once this information becomes available, i.e., once the circus is scheduled for the location (city) in which PC 31 is located, a message is sent to PC 31, or to a particular alternate location, saying in effect: "The circus will be in Dallas, Tex. August 15th through the 28th. Do you still desire 4 tickets?" If the posting user answers "yes," then via Internet 100, or otherwise, information provider 21 may arrange with user 31 for the delivery of and payment for the tickets. The provider may contact one of a number of ticket sources to provide the tickets, which ticket could be printed on printer 33 at the user's location, or the provider could issue the tickets directly. Note that at the time the request was made by PC 31, the circus had not been scheduled for Dallas and therefore, under known systems, the user of PC 31 would not have been able to post a general request for information pertaining to the circus.

Under the system of this invention, the user at PC 31 could put into his or her PC all of the activities that the user would like to do within the next six months, one year, or whatever, including plays, sporting events, TV programs, movies, music concerts, artists, books or any other type of activity, and the user will be contacted (if desired) at the appropriate time when the information on each activity is made available. The user could input his/her sought information from a pager, a wireless phone or a hand held processor and these requests would be stored and made available as discussed above.

Figure 4:
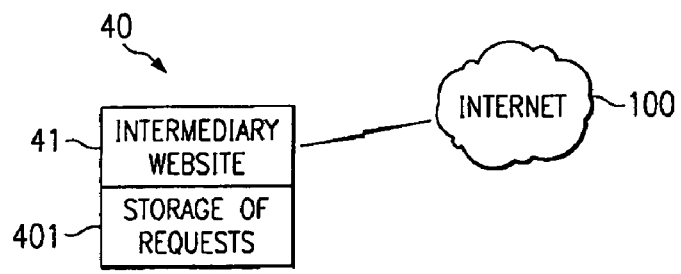
FIG. 4 shows an intermediary web site adapted to accepting user's requests.

FIG. 4 shows an intermediary web site 41 which acts to collect information from many users and provides a central place for information providers, such as information provider system 20 (FIG. 2) to search. In such a situation, search engine 22 could search the entire Internet looking for any user having a flag indicating that it has a desired request, or it could instead search the intermediary web sites, or it could do both if desired. These web sites would contain in storage 401 requests from various users. Intermediary web site 41 could then provide various services for the end user, such as the coordination of the tickets, flights for vacation, scheduling and other such activities, such as payment and filtering.

Intermediary web site 41 could record and receive information directly from a user such that the user would log onto the web site and answer a series of questions, thereby recording the information that it seeks. Alternatively, web site 41 could periodically go out and upload (using search engine 22 or otherwise) from various user sites information that the users are seeking to receive. In either event, the centralized server, or servers, could themselves wait so that they would be accessed by information providers on an inquiry basis much like the information providers would do if they were searching for individuals who had flags set for them to review. However, alternatively, the central servers could actively go out on a periodic basis scanning the Internet for information to satisfy requests that they have received.

Once the end user posts the information, either locally or on the server, it is available continuously for either a period of time dictated by the user or dictated by common sense based upon the information requested. The request would remain available until such time as the information is provided, the program distributed, the time for the circus has come and gone, or other actions taken. This system, in operation, acts as a push system so that information is pushed down to the end user but only in response to flags or codes set by the end user.

For example, a convention could be established that information in a data base that has a certain ending, such as FLG (for flag), is always available for review by any legitimate party. Of course, it could be established that only certain parties could look at certain flags such that the message itself could give permission for certain types of providers to respond to different types of messages. Thus, the FLG message could be a message that is open to anyone, whereas a FLG1 message is open to only certain segments of information providers where FLG2 is open to other segments of providers, etc. Therefore, a hierarchy could be established that would allow an end user to determine who has access to the requests and how and by whom those requests are to be honored.

Today typically such requests are made in bulk such that a user or pager could request that all baseball scores (or weather, or stock quotes) be downloaded periodically to the end user. In typical operation, such systems are subscription services where the person subscribes to a service that provides information and the information is gathered by an intermediary the intermediary establishes what information is to be provided and the end user simply subscribes. One such service is shown at AVANTGO.COM and allows subscribers to obtain stock quotes and other information, upon logging onto the site. The difference in the inventive system is that the user does not subscribe to preestablished data but is free to request any information, even information that is not available at the time of the request, and that information could come from any provider who has the required data and who wishes to deliver the data either free or for a charge at a particular time under a particular medium.

FIGS. 5-8 show simple flow charts which can be rearranged to run on one or more processors. These processors could be central to everyone, or could be at a provider location, FIG. 2, or at a destination location, FIGS. 1 and 3, or at an intermediary web site, FIG. 4. These processors could be general purpose computers or could be specialty devices, as desired by a system designer as is well known in the art.

Figure 5:
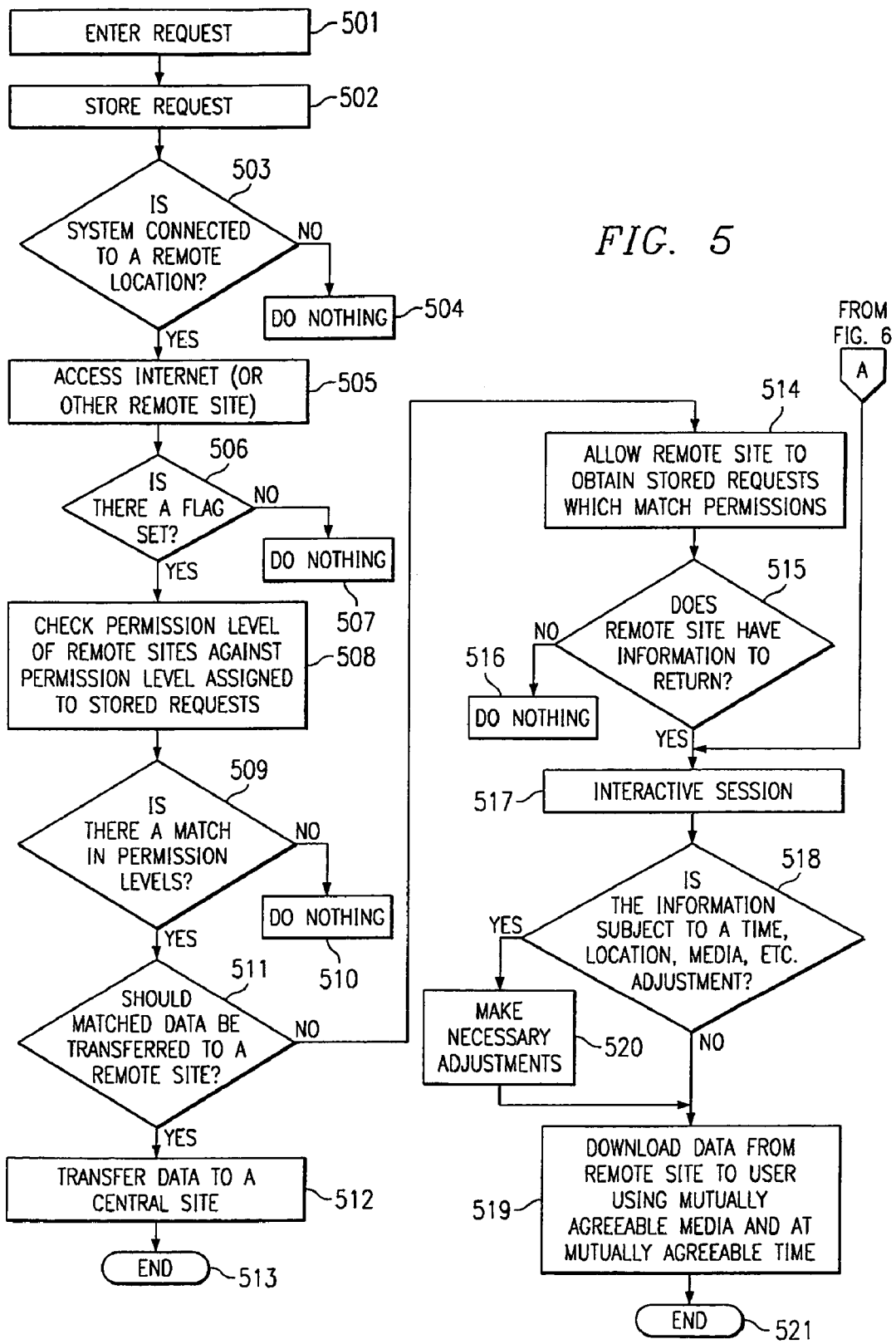
FIG. 5 is a flow chart of one embodiment of the invention where the user stores abstracts of his/her desired information.

FIG. 5 shows box 501 which is an interactive request routine which allows a user either using a PC, or a TV with remote control, or a TV with a keyboard, or any type of input device, including voice recognition, to enter requests for information. These requests can be as broad or as specific as desired. For example, a user wishing to see a documentary on George Washington may simply just say "George Washington" or "documentary on George Washington", or if the user knew that a series had been aired sometime in the past, the user could identify the series, or could simply say a "two hour documentation of George Washington", or any additional information the user desires to add. The user, for example, could request information pertaining to future events, such as information about fires or public disasters, when they occur, or could request information on any sporting or entertainment event. Note that the user could be more specific and request scores, or statistics, on the Texas Rangers, or could request that all Stanley Cup Hockey games be received on his/her digital recorder and all final scores delivered to his/her pager. This request could be limited to local events, in which case the system might require the user to input the locality, or the system, as will be discussed, might calculate the locality based on information it has or can obtain about the user. Under control of box 502 the user could, for example, enter information, as discussed in FIG. 1 or in FIG. 3, pertaining to TV shows, software, music, movies, plays, concerts, artists, etc.

Box 502 stores the request and could abstract certain words as key words and also would add, if desired, flags and permission levels as to who can respond and under what conditions. For example, a flag could be that only responses from one of the major TV channels would be accepted or another flag could be that only a particular channel is acceptable for delivery. Another flag could indicate that anyone with information could respond. Some flags could identify whether the user wanted the information to come via video on the public channels or privately over the Internet or via a wireline or wireless communication through a hand held personal communicator. Note that any system can be used to grant permissions to various would be providers, including dedicating a portion of the abstracted information for such housekeeping chores.

In box 503 the local system optionally determines if it is connected to a remote location. This could be connected immediately or connectable for a period of time, such as periodically, with a phone call or connected whenever the user enters the Internet for other purposes. If there is not a connection, then box 504 does nothing.

Box 505 detects a connection to the Internet or to another remote site or detects that an information provider wishes to check for stored requests. This connection can be either accessed under control of the user by logging on, for example, to the Internet or accessed to a remote site by a phone call (wireline or wireless) being placed by the unit or simply a permanent connection which is available for access by anyone looking for request flags. Box 505 could be set to access the Internet (or some other location) periodically.

Box 506 makes a determination as to whether a flag is set in the user's data. If there is no flag set, then no data will be read, box 507.

If a flag has been set, however, then box 508 (if this feature is active) begins the permission level checking to determine if the permission level of the potential information provider matches the permission level assigned to the stored requests. If there is a match in levels, box 509 detects that match and box 511 determines whether all of the matched data is to be transferred to a remote site or is to remain stored locally. If the information is to be transferred, box 512 attends to the transfer and box 513 ends the transmission. However, if the information was not to be transferred, then box 514 allows the remote site, again once permission has been granted, to obtain the stored requests which match the permissions.

Box 515, which typically would be activated at the remote site, but which could in actuality be programmed to occur locally, determines whether there is information to return to the user. If there is such information, then if desired an interactive session can be controlled under box 517. The user can be on line to answer questions live. More typically, the user would have a local program to screen permission levels which would interact automatically with the remote site to determine when the program information will be delivered, under what media it would be delivered, and would negotiate any other required parameters, such as cost, liabilities, rights of the end-user and such. If it is determined during the interactive session that a download of data will occur, box 519 controls that download such that both parties are in agreement as to what, when, how and where that transmission will occur. At box 520 the session is ended.

Note that if desired, a filter, or set of filters, could be used, as in box 518, to change the timing of delivery, or to change the locality for the information. These filters could be set by the user, could come from the physical location of the user (either when the request is entered or after the requested information is delivered) or would be derived from the context of the requested information.

For example, assume that a user wishes to stay at a particular hotel chain when traveling. The user could enter the hotel chain into a hand held device. As the user moves around the world, the user's display would continually change to reflect the address and phone number of the local hotel in that chain. In this same manner, the delivery of TV programming would be adjusted to match the time zone of the location where the program is being delivered, regardless of where the request came from. Therefore, a user traveling in one city could request that a particular program be recorded at a particular time on his/her home TV in another city, or the user could view the program guide, including proper times, for one city while traveling in another city in a different time zone.

Figure 6:
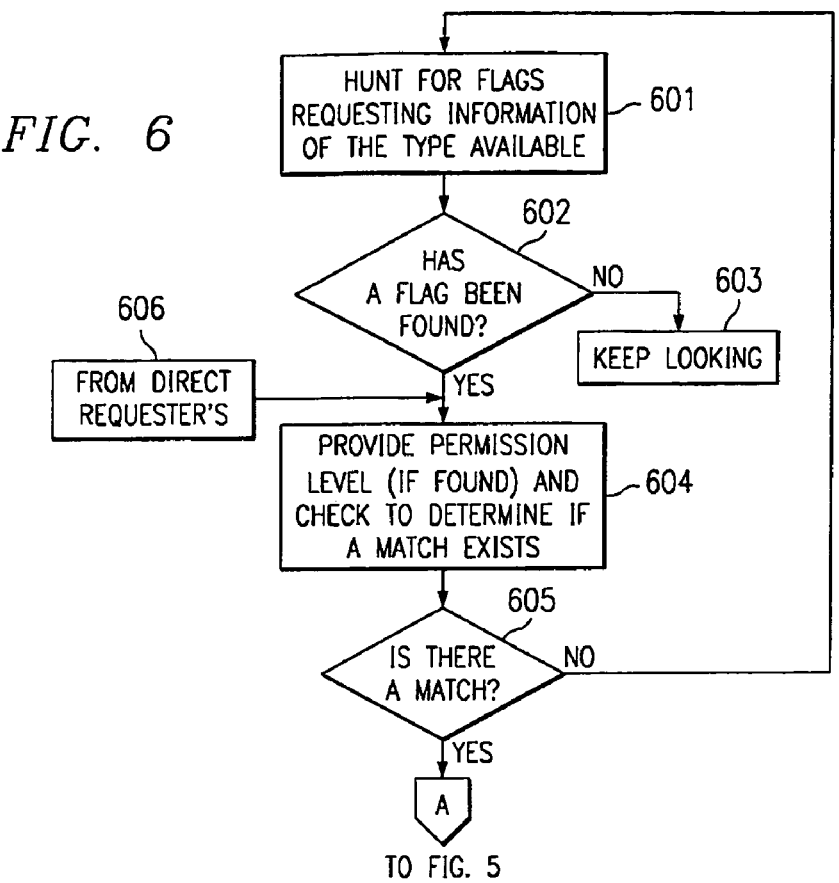
FIG. 6 is a flow chart of one embodiment of the invention where an information provider searches for flags indicating that a person is seeking information and checks for matches between the information available and the information desired.

FIG. 6 shows an embodiment of the system and method of operation at the information provider site where boxes 601, 602 603 hunt for flags requesting the type of information that the provider has available. This hunt can be made periodically on the Internet to all users of the Internet or to specific sites which would be acting as intermediaries.

When a flag has been found, box 604 provides the permission level of the information provider that is required and checks box 605 to determine if a match exists. If a match exists, then the system either goes to interactive session, box 517, as discussed previously with respect to FIG. 5, or goes directly to box 518, or to box 519, depending on the operation of the system. If there is no match, and when matches have been handled, the system continues the hunt for flags.

Box 601 can be bypassed in situations where external information is made available telling the system that there is a flag set. For example, in the TV system described above, the user would have its information uploaded, perhaps once every 24 hours, by a telephone call from the user to a remote location. When the remote location, such as location 14, FIG. 1, determines that a user desires a certain program or other information, the remote site then activates the various information providers, via box 606, thereby launching the program to see if and when information is available.

Figure 7:
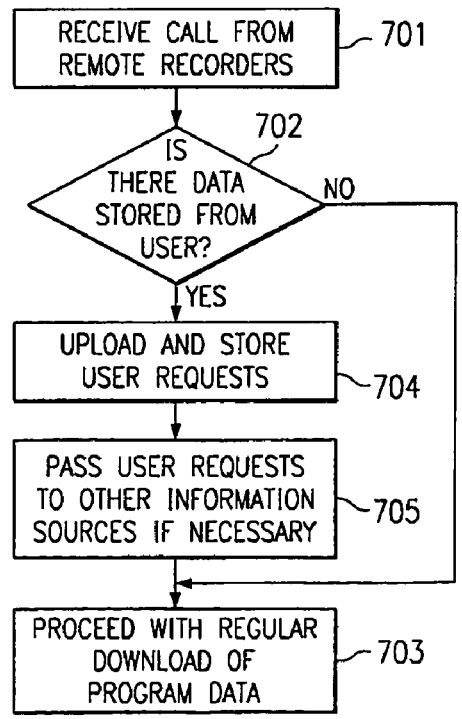
FIG. 7 is a flow chart of one embodiment of the invention where a central control in a TV program control system receives information from various users and provides return programming in accordance with posted requests from users.

FIG. 7 shows a typical scenario where a digital recorder system such as shown in FIG. 1 is used between the user and the central system. Box 701 at the central system receives a call from each remote recorder on a periodic basis. Box 702 checks to see if data has been received from the user. If not, then the system via box 703 proceeds with its regular download of program data. If there are requests received from the user, then the system uploads and stores the user request via box 704. As discussed previously, box 705 passes the user request to other information sources (such as to box 606, FIG. 6), if necessary, or simply stores the information for future comparison to programs that will become available at some time in the future.

Note also that while in the TV system usually it would be specific programs that are requested, the user might request different types of data. For example, the user could ask for a program listing for next month, or could request a list of music which is available, or a list of future music. Also, the information requested by the user via the TV system need not be limited to entertainment but could be general information requests that could be returned via a PC or via the TV screen.

Figure 8:
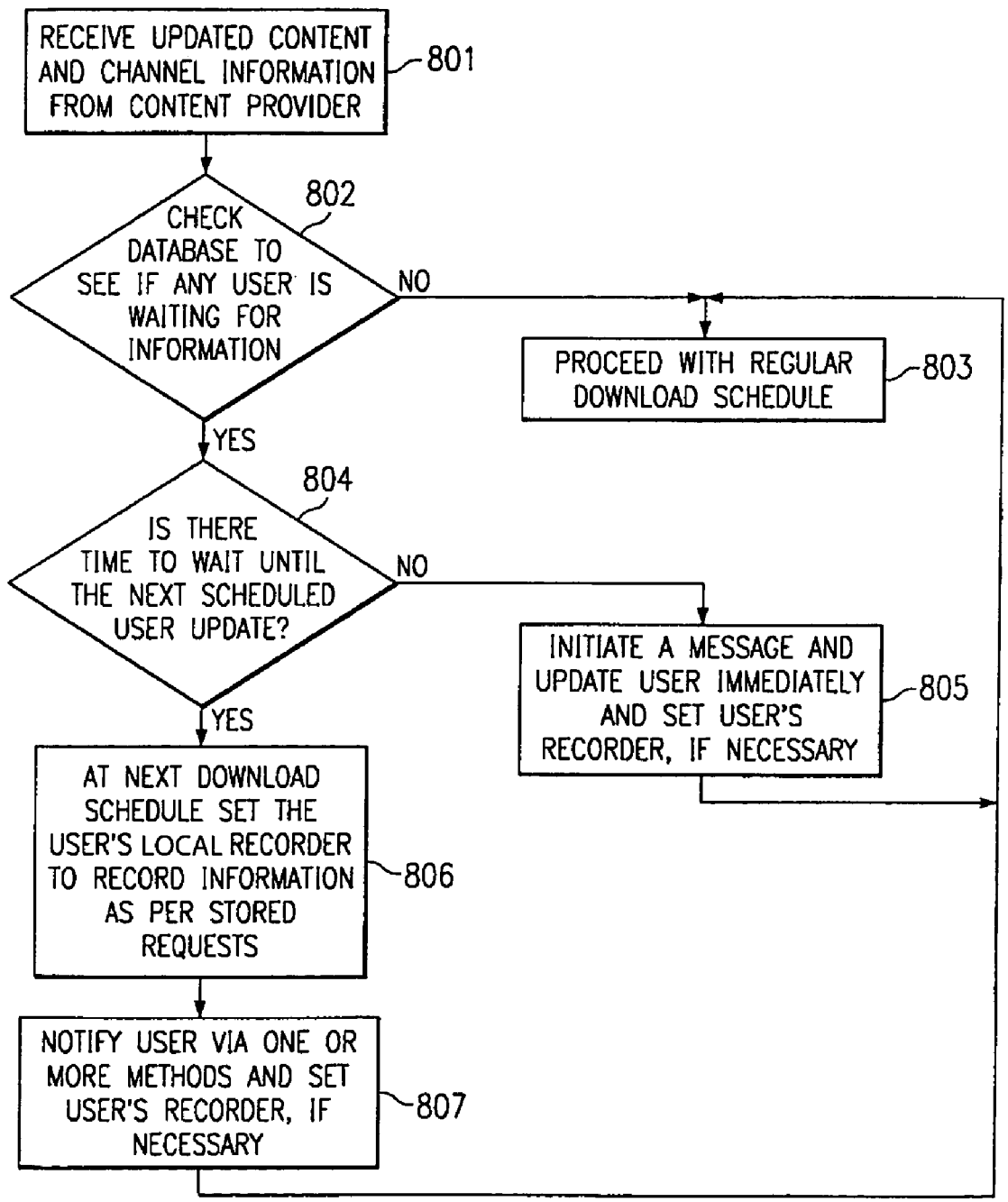
FIG. 8 is a flow chart of one embodiment of the invention where the central control sends requested information to a user.

In FIG. 8 the central TV system, such as shown in FIG. 1, receives updated information content, such as movies, programs, other information, as well as channel information, from various content providers. The system then checks its data base to see if any user is waiting for this information. This is accomplished via box 802. If no user is waiting for the information, then the system proceeds with its regular downloaded schedule with respect to the users via box 803.

If it is determined that there is a data request from any particular user or set of users that pertains to the new information, then the system via box 804 determines if there is time to wait until the next scheduled user update before providing the information to the user. This would typically be the situation since the system typically stores several weeks of information and that information would have been available had the user selected a movie or program that was known to be available. However, some situations are such that the requested information could be inserted because of user demand and thus the system would have to initiate a message and update the user immediately and set the user's recorder, if necessary, via box 807. This message could be a telephone call, an e-mail message, or simply setting the user's recorder and would not wait until the scheduled call.

One example of this type of immediate update would be if the user had selected sports programs, such as, for example, the Stanley Cup series where each game would be allocated a three hour time interval. The user could also have set a flag saying that he/she wanted the recording time extended if a particular game took longer than three hours. If the system determined that the game is going to last longer than three hours, the system could initiate a message to delay ending the record time for that user until a separate signal is sent indicating that the game is over. Under this scenario, if a network changes its schedule at the last minute or adds information, that information could be made available to specific users depending upon the flags that have been set by each user.

Thus, if a user has scheduled a particular movie for 6 p.m. on Sunday and the football game which preceded the movie was not over until 6:15, the user's system could be notified and the recorder changed to reflect the correct recording time. In a situation where there is time to wait until the next scheduled update, box 806 sets the user's local recorder to record information as per the stored request if that is the desired result, and in box 807 notifies the user via one or more methods and sets the user's recorder again if necessary.

While the invention has been discussed in terms of a situation where a user simply "flags" desired information for pick up by an information provider, in actual use a person desiring information, such as from the Internet or from an entertainment guide or from any other source, could first contact that source, or set of sources. If the requesting user failed in his/her attempt to obtain information, or to schedule a program or to obtain tickets (or anything else desired) then that requesting user could, if desired, leave a "flag" with the desired information. This would allow providers to find the "flag" and deliver the desired information at a later time.

Note also that while a TV system and an Internet system have been shown for illustrative purposes, any other type of information retrieval system could be used. Thus, a wireless network or a pager network or even a private network could employ the concepts disclosed. For example, an insurance company network, a referral network or even a pharmacy network could be arranged to allow customers (doctors, patients, third parties, etc.) to post diagnosis, Rx questions, medical questions, referral issues and these would be answered when the information became available.

One example might be that a user of a particular medicine could post that information and request updates on side effects of the drug. Any provider, anywhere in the world, could, from time to time, provide such information. People could seek information on a particular treatment or on a particular doctor or hospital or business and, as that information became available, would receive replies from anyone having such information. As discussed above, the requesting party could set flag permission levels which could control who (and under what circumstances) someone could "see" the request and/or provide responses thereto.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

Although the present invention and its advantages have been described in detail, it should be understood that various changes, substitutions and alterations can be made herein without departing from the invention as defined by the appended claims. Moreover, the scope of the present application is not intended to be limited to the particular embodiments of the process, machine, manufacture, composition of matter, means, methods and steps described in the specification. As one will readily appreciate from the disclosure, processes, machines, manufacture, compositions of matter, means, methods, or steps, presently existing or later to be developed that perform substantially the same function or achieve substantially the same result as the corresponding embodiments described herein may be utilized. Accordingly, the appended claims are intended to include within their scope such processes, machines, manufacture, compositions of matter, means, methods, or steps.

What is claimed is:

1. A method for allowing a user to receive programs desired by said user, said method comprising:

accepting from said user information pertaining to a program desired to be viewed by said user;

storing said user information on a user device at a location of said user;

matching by a first entity, other than said user, said accepted user information stored on said user device at said user location against a list of known programs currently scheduled to be delivered to users;

upon a non-match condition making said user request available for discovery at the initiative of potential content providers by setting a flag on said user device at said user location, said potential content provider being an entity different from said first entity;

matching, by said potential content provider, information available to said content provider against said user request; and delivering programs to said user from said potential content provider which match said accepted descriptive material.

2. The method of claim 1 wherein said delivering occurs only when both said user and a potential content provider are in agreement as to both content and terms of delivery after a match has occurred.

3. The method of claim 1 wherein said delivered content is subsequently constructed for said user based on said user's requests.

4. The method of claim 2 whenever said terms comprise: agreement to at least one of the following: delivery time, cost, liability, end-user results.

5. The method of claim 3 wherein said user's requests pertain to said user's location.

6. The method of claim 1 further comprising:

enabling a recorder at said user's location to record said programs when matched ones of said programs are delivered to said user Irvin said potential content providers, said recorder being set for recording at the appropriate time; and adjusting the timing of said recording in accordance with the location of said user.

7. The method of claim 1 wherein said matching includes: comparing a program provider's identity against a permission level set by said TV user.

8. The method of claim 1 wherein said matching includes:
interacting with said user to determine if any said match is acceptable to said user.

9. The method of claim 1 wherein said accepting includes:
accepting said program information over a network separate from the network used to deliver said desired program.

10. A system for delivering entertainment programs to a user, said system comprising:
means for allowing said user to input and store desired programs on a device controlled by and at a location of said user;
means independent from said user's control for determining which, if any, of said stored desired programs are currently available to said user; said determining means controlled, at least in part, by a first program provider in communication with said user;
means controlled in part by said determining means for informing said user that one or more of said stored desired programs are currently available and for subsequently informing said viewer that desired programs which were determined not to have been currently available to said user have become available; and
wherein said determining means includes:
means for allowing at least one potential program provider other than said first program provider to review determined unavailable desired programs by setting a flag on said user controlled device, to determine if said potential program provider can deliver to said user one or more of said unavailable desired stored programs.

11. The system of claim 10 further comprising:
means for allowing said potential program provider to create a program for said user based on said user's desired programs.

12. The system of claim 10 wherein delivering of said desired program occurs only when both said user and a potential program provider are in agreement as to content and terms of delivery.

13. The system of claim 10 further including:
means tor controlling recording times of delivered ones of said desired programs in accordance with the actual delivered time of such program at a user's location.

14. A method for allowing a user to receive entertainment programs desired by said user, said method comprising:
recording, under control of said user, and on a device controlled by and at a location of said user requests pertaining to a program desired to be viewed by said user; said desired programs not necessarily currently scheduled, either as stand-alone programs, programs which are part of a series, or programs which have not yet been created for availability to said user;
accessing recorded ones of said requests by other than said user;
determining, at least in part independent of control by said user, whether or not a program corresponding to an accessed request is currently scheduled so as to be available for delivery to said user;
upon a determination that there are no currently scheduled programs matching an accessed request, making said user request available by setting a flag on said user controlled device so that potential third party content providers may determine if they have content matching a request identified by said flag; and
allowing said potential content provider to deliver to said user electronically a program corresponding to said user-requested program only after both said user and said potential content provider are in agreement as to terms of said delivery.

15. The method of claim 14 further comprising:
allowing said user to receive said corresponding program from said potential content provider when said corresponding program is determined to be available for delivery to said user.

16. The method of claim 14 wherein said desired program is a request for specific facts to be included in said desired program and wherein said potential content provider provides current updated facts pertaining to said desired program within said desired program.

17. The method of claim 16 wherein said updated facts are constructed for said user based on said user's requests.

18. The method of claim 14 further comprising:
upon a determination that there are no currently scheduled programs matching an accessed request, continuing to repeat for a user defined period of time said accessing, determining and matching.

19. The method of claim 18 further comprising:
enabling a recorder at said user's location to record programs when a match is determined with a subsequently scheduled program.

20. The method of claim 14 further comprising:
delivering said electronic program to said user at an alternate device identified by said user, said alternate device being a device other than said device upon which said user request is recorded.

* * * * *